United States Patent
Ward

(10) Patent No.: US 7,400,072 B2
(45) Date of Patent: Jul. 15, 2008

(54) BOLTED SPHERICAL SERIES AND PHASE CONNECTOR FOR STATOR COILS OF ELECTRICAL GENERATORS

(75) Inventor: Robert A. Ward, Rockledge, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 352 days.

(21) Appl. No.: 11/295,994

(22) Filed: Dec. 7, 2005

(65) Prior Publication Data

US 2006/0125343 A1    Jun. 15, 2006

Related U.S. Application Data

(60) Provisional application No. 60/635,027, filed on Dec. 10, 2004.

(51) Int. Cl.
  *H02K 3/50* (2006.01)
  *H02K 11/00* (2006.01)
(52) U.S. Cl. ............... 310/71; 310/260; 439/798
(58) Field of Classification Search ............ 310/71, 310/260, 270; 439/798
See application file for complete search history.

(56) References Cited

U.S. PATENT DOCUMENTS

| 4,385,254 | A | 5/1983 | Vakser et al. |
| 4,415,825 | A | 11/1983 | Dailey et al. |
| 4,488,079 | A | 12/1984 | Dailey et al. |
| 4,501,985 | A | 2/1985 | Dobson et al. |
| 4,806,807 | A * | 2/1989 | Levino ............... 310/71 |
| 4,894,575 | A | 1/1990 | Nilsson et al. |
| 4,912,831 | A * | 4/1990 | Levino ............... 29/596 |
| 5,270,598 | A | 12/1993 | Holly, III et al. |
| 5,573,414 | A | 11/1996 | Taillon et al. |
| 5,583,388 | A | 12/1996 | Paroz et al. |
| 5,693,996 | A | 12/1997 | Neidhofer et al. |
| 5,789,840 | A | 8/1998 | Gould et al. |
| 6,373,165 | B1 | 4/2002 | Rowe |
| 6,538,339 | B2 | 3/2003 | Krizek et al. |
| 6,577,038 | B2 | 6/2003 | Butman et al. |
| 6,628,024 | B1 | 9/2003 | Mirmobin |
| 6,897,584 | B2 | 5/2005 | Doherty et al. |
| 7,321,179 | B2 * | 1/2008 | Ward et al. ............... 310/260 |

FOREIGN PATENT DOCUMENTS

| DE | 1 639 179 | 1/1971 |
| DE | 2 245 874 | 3/1974 |
| EP | 0 368 556 A2 | 5/1990 |

* cited by examiner

Primary Examiner—Tran Nguyen

(57) ABSTRACT

A connector arrangement and techniques are provided for reducing eddy current losses and/or skin effects while enabling more readily serviceable series and phase connections between the coil ends 12 and 18 of a generator stator 10. This may be achieved by providing a connecting structure 24 that enables two parallel electrically conductive paths 26 and 28 that are electrically insulated from one another for passing a respective flow of electric current between the coil ends.

4 Claims, 3 Drawing Sheets

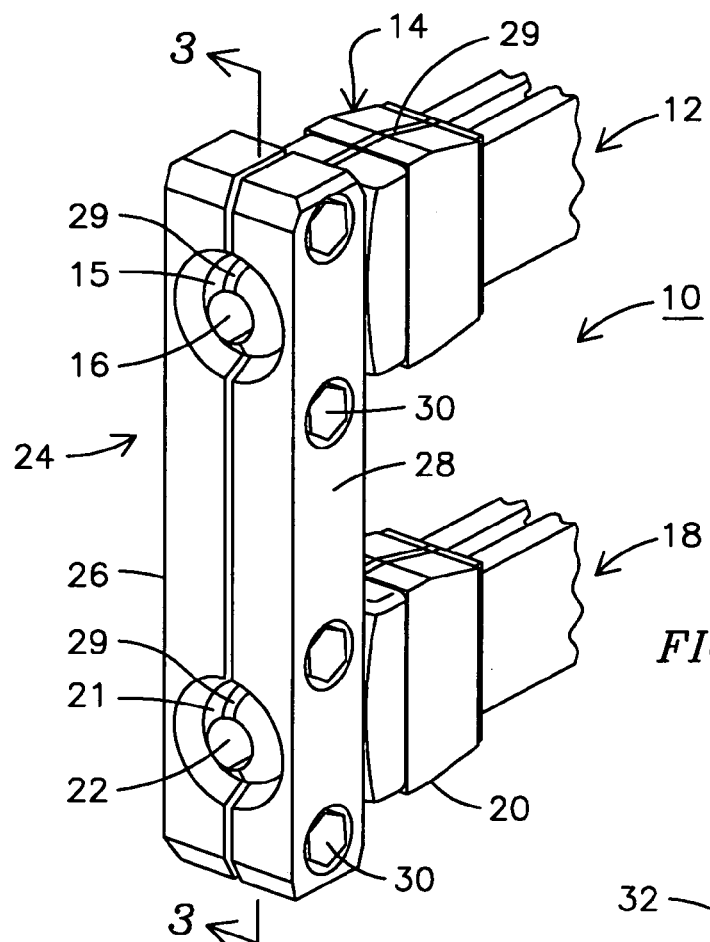
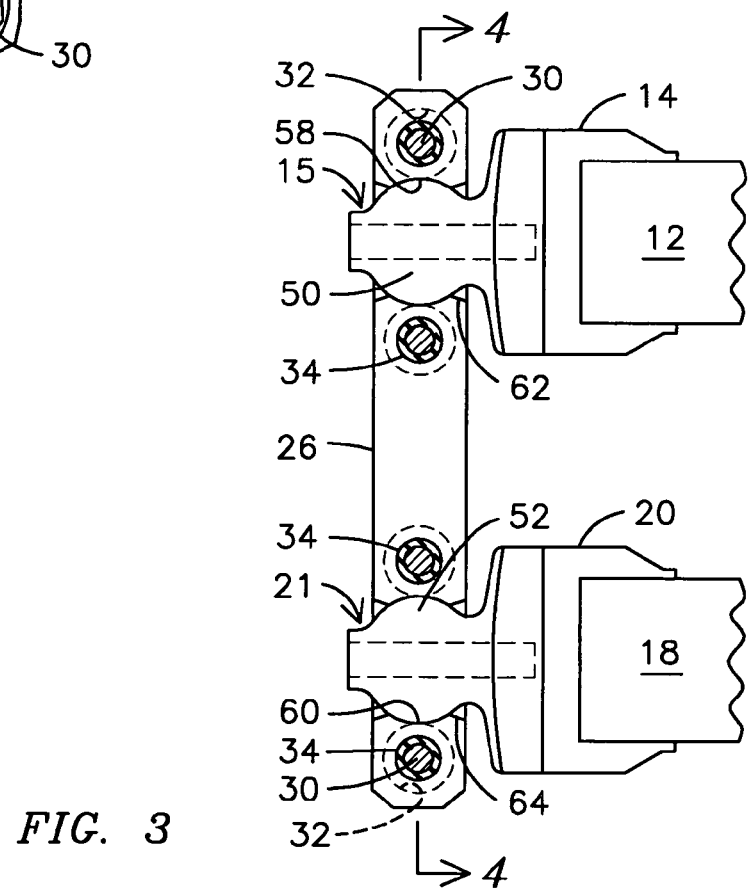
FIG. 1
FIG. 3

BOLTED SPHERICAL SERIES AND PHASE CONNECTOR FOR STATOR COILS OF ELECTRICAL GENERATORS

CROSS REFERENCE TO RELATED APPLICATIONS

This application claims the benefit of U.S. Provisional Patent Application No. 60/635,027 filed on Dec. 10, 2004, which is incorporated herein by reference in its entirety.

FIELD OF THE INVENTION

This invention relates to series and phase connectors for electrical generators, and, more particularly, to connectors having spherical geometry and providing at least two parallel electrically insulated paths for making electromechanical connections in an electrical generator.

BACKGROUND OF THE INVENTION

The environment of the present invention is that of relatively large electrical machinery, e.g., electrical generators driven by turbines in a power generating plant. The size and configuration of such generators generally require that, to facilitate the installing or replacing of the stator coils of the generator, these coils be arranged in physically separate coil sections, or halves, which, after they are set in their appropriate location, need to be electrically and mechanically connected to one another at their ends. Similar connections may also be utilized between the ends of each phase coil and a parallel phase ring that may encircle the end of the generator stator windings. Maintaining consistently reliable series and phase connections between such coil ends is an important consideration both from a mechanical and an electrical standpoint.

It is known to use brazing techniques to affix connectors, such as made up of solid copper bars, to the coil ends. This can provide effective series and phase connections between the coil ends. However, such techniques may be time-consuming and could take up to three days for performing a service rewind operation even for experienced and skilled service personnel. Thus, there is a need to reduce the time for performing such operations.

BRIEF DESCRIPTION OF THE DRAWINGS

These and other advantages of the invention will be more apparent from the following description in view of the drawings that show:

FIG. 1 is a perspective view of the ends of a pair of exemplary coil sections of a generator stator, and one exemplary connector structure as assembled for connecting those ends in accordance with aspects of the present invention.

FIG. 3 is a side view of a pair of coil sections ends and a connector embodying aspects of the present invention.

DETAILED DESCRIPTION OF THE INVENTION

As used in the following description, connection of coil ends refers to the connection of ends of coil halves or sections, as well as the connection of coil ends to phase rings. Further, the phase coil ends embraces both coil ends and the headers of the generator phase parallel ring. Thus, a connector embodying aspects of the present invention may be used on either of the above-described connecting applications.

Figure 2:
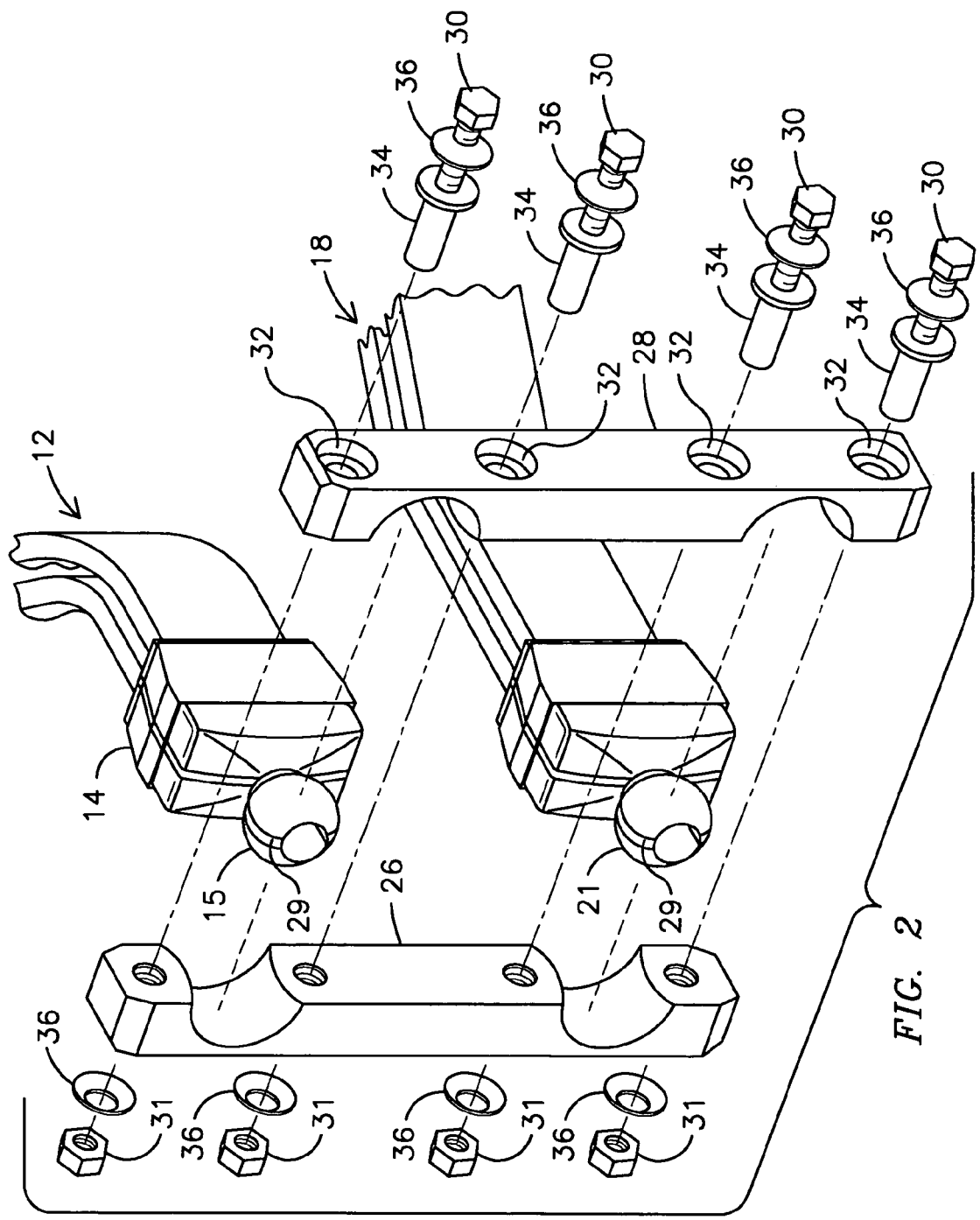
FIG. 2 is an exploded view of the structure shown in FIG. 1.

Turning first to FIG. 1, there is shown a perspective view of the ends of a pair of exemplary coil sections of a generator stator 10, and one exemplary assembled connector structure for connecting those ends in accordance with aspects of the present invention. As will be readily understood by one skilled in the art, these coils are components of generator stator 10, which in turn is part of a large electrical generator used, for example, in a power generating plant. FIG. 2 shows an exploded view of exemplary components of the exemplary connector structure shown in FIG. 1.

A top coil section 12, which may represent a first half of a coil loop, is shown as terminating in a top coil header 14 having a respective header cap 15. In one exemplary embodiment, a top coil conduit 16 may be provided in the top header cap to pass a cooling gas, such as hydrogen or air, to provide internal cooling to the stator windings. Similarly, a bottom coil section 18 terminates in a bottom coil header 20 having a respective header cap 21 that may include a bottom coil conduit 22 to pass the cooling fluid. It will be appreciated that although FIG. 1 illustrates the top and bottom coil sections 12 and 18 as each comprising two separate Roebel bars, such coil end sections need not be made up of separate Roebel bars since a singular Roebel bar construction could be employed.

Connector means 24, which in one exemplary embodiment comprises a first connector bar 26 and a second connector bar 28, snugly receives header caps 15 and 21 to thereby provide a secure mechanical and electrical connection between the top coil section 12 and bottom coil section 18 of the coil loop. The connector bars may be made of copper or any other suitable electrically conductive material that meets the structural strength and current-carrying capacity requirements of any given application.

The inventor of the present invention has innovatively recognized a connector arrangement that advantageously enables to reduce eddy current losses and/or skin effects while providing more easily serviceable series and phase connections between the coil ends. In one exemplary embodiment, this is achieved by providing a connecting structure that enables at least two parallel electrically conductive paths that are electrically insulated from one another for passing a respective flow of electric current between the coil ends.

One exemplary connecting structure with dual parallel electrically insulated paths may be achieved by configuring the headers 14 and 20 and their respective header caps 15 and 21 to be made up of two bifurcated (e.g., split) structures electrically insulated from one another by way of a suitable insulating material 29. By way of example, insulating material 29 may be a high-temperature, low mechanical creep, electrically insulating material, such as National Electrical Manufactures Association (NEMA) Grade G-11. As will be appreciated by those skilled in the art, this is an example of a glass-epoxy composite material with substantially high strength and high dimensional stability over a wide temperature range.

In one exemplary embodiment an air gap may be disposed between first connector bar 26 and second connector bar 28 to continue the two parallel electrically insulated paths so that each bar passes a respective flow of electric current. It will be appreciated that the spacing of the air gap should be selected sufficiently wide, based on the needs of any given application such as the expected peak current levels to be carried, to avoid current crossover between the bifurcated structures.

As described above, the foregoing exemplary arrangement enables at least two electrically conductive parallel paths that are electrically insulated from one another for passing a respective flow of electric current between the coil ends.

Figure 5:
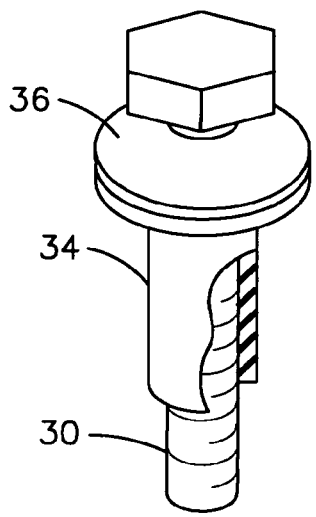
FIG. 5 is perspective view of an exemplary electrically insulating sleeve that may be disposed on a conductive affixing bolt to prevent an electrical connection between a pair of connector bars affixed by such a bolt.

Affixing means, such as comprising a plurality of bolts 30 as may be installed in corresponding bolt openings 32 in the connector bars, locking nuts 31, and washers 36, e.g., washer springs, may be used for affixing first connector bar 26 and second connector bar 28 together and to provide a tight mechanical coupling with header caps 15 and 21. In accordance with aspects of the present invention, each bolt 30 is designed to provide electrical insulation between first connector bar 26 and second connector bar 28. In one exemplary embodiment, the bolts may be made up of a high strength material, such as steel. In this case, as illustrated in FIG. 5, an electrically insulating sleeve 34 may be circumferentially disposed to axially extend about a bolt segment to prevent an electrical connection between the respective bolt segment covered by that sleeve and a corresponding portion of one of the connector bars. A second sleeve (not shown) opposite to the first sleeve may be optionally provided to similarly avoid an electrical connection between the respective bolt segment covered by that second sleeve and the corresponding portion of the other connector bar. Another option would be to electrically insulate each bolt from end-to-end with a single insulating piece.

Turning next to FIG. 3, the electrical/mechanical connection between top coil section 12 and bottom coil section 18 is described below in greater detail. In one exemplary embodiment, both top coil header cap 15 and bottom coil header cap 21 are provided with spherically shaped central portions 50 and 52 respectively. Each connector bar 26 and 28 includes spherically shaped seat portions 58 and 60, respectively, for receiving the spherical central portions 50 and 52 of top coil header cap 15 and bottom coil header cap 21 respectively. The spherically shaped seat portions 58 and 60 are configured to provide a complementary surface to the spherically shaped portions 50 and 52 and effectively constitute a top detent 54 (FIG. 4) and a bottom detent 56 (FIG. 4) for receiving the top header cap 15 and the bottom header cap 21 respectively.

In one exemplary embodiment, in order to maintain an appropriate electrical/mechanical connection between top coil section 12 and bottom coil section 18 while allowing for coil misalignment, such as may occur due to circumferential and/or radial dimensional tolerances, each detent 54, 56 may be provided with widened portions 62 and 64, respectively, configured to provide a respective small gap between detents 54 and 56 and corresponding parts of the spherically shaped portions 50 and 52 so to accommodate any such misalignment.

Figure 6:
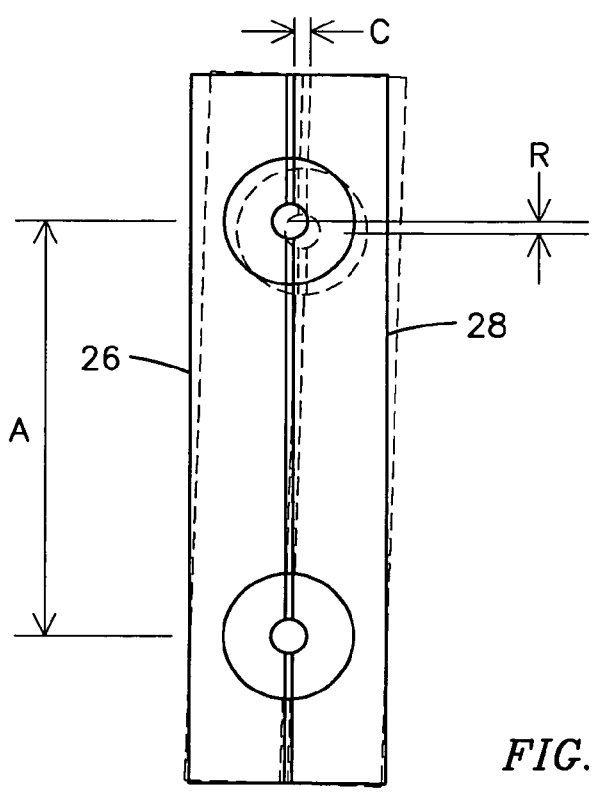
FIG. 6 illustrates a schematic representation for visualizing exemplary circumferential and radial dimensional tolerances to which a connector structure embodying aspects of the present invention may be subjected.

FIG. 6 illustrates a schematic representation for visualizing exemplary circumferential and radial dimensional tolerances, represented by the lines labeled with the letters C and R, respectively. FIG. 6 also shows a line labeled with the letter "A". This line represents an exemplary spacing between the spherical portion 58 of top detent 54 and the spherical portion 60 of bottom detent 56.

Figure 4:
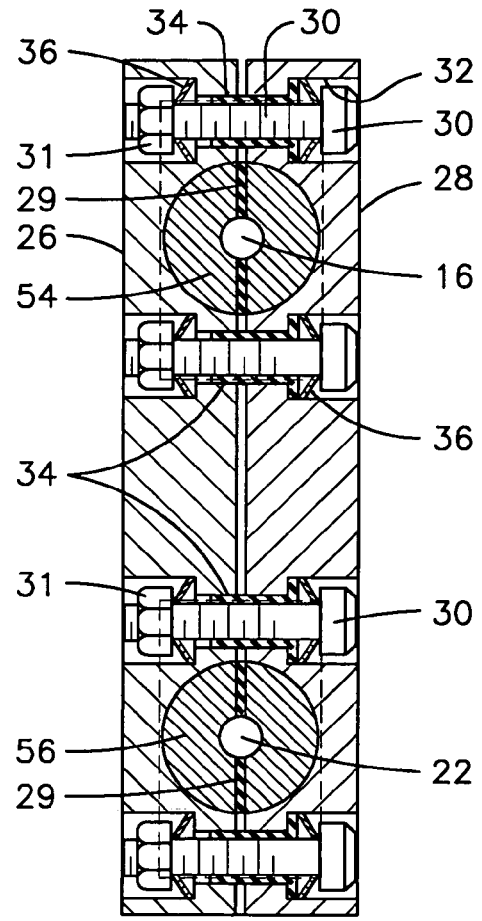
FIG. 4 is cross-sectional view along line 4-4 of the connector of FIG. 3.

Turning next to FIG. 4, a cross-sectional view is taken along lines 4-4 of FIG. 3 to better appreciate the attachment of connector bar 26 to connector bar 28 utilizing bolts 30 which extend through bolt-receiving openings 32 to clamp connector bars 26 and 28 together.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. An electrical generator comprising:

at least one pair of stator coil sections having spaced apart ends each having a header cap configured to define a spherical geometry, wherein each header cap comprises split header cap portions of a conductive material to provide at least two parallel paths for passing a respective flow of electric current;

an electrical insulating material interposed between said split header cap portions;

a connector for connecting said pair of coil sections at their ends through said header caps, wherein said connector is configured to maintain electrically insulated said at least two parallel paths for passing the respective flow of electric current, wherein said connector comprises at least two connecting bars of a conductive material;

an air gap interposed between said at least two connecting bars, wherein each of said bars includes two detents configured with a geometry complementary relative to the geometry of the header caps for tightly receiving said header caps; and means for mechanically affixing said at least two connecting bars to one another while maintaining said air gap there between.

2. The electrical generator of claim 1, wherein said mechanical affixing means comprise a plurality of bolts of a conductive material, and wherein each bolt includes at least one insulating sleeve disposed over a respective bolt segment to prevent an electrical connection between the respective bolt segment and a corresponding portion of one of the connector bars.

3. The electrical generator of claim 1 wherein each header cap includes a conduit for passing a cooling fluid.

4. The electrical generator of claim 1 wherein each detent has a portion configured to accommodate circumferential and/or radial misalignment that may occur between said coil ends.

* * * * *